Figures 1, 7:
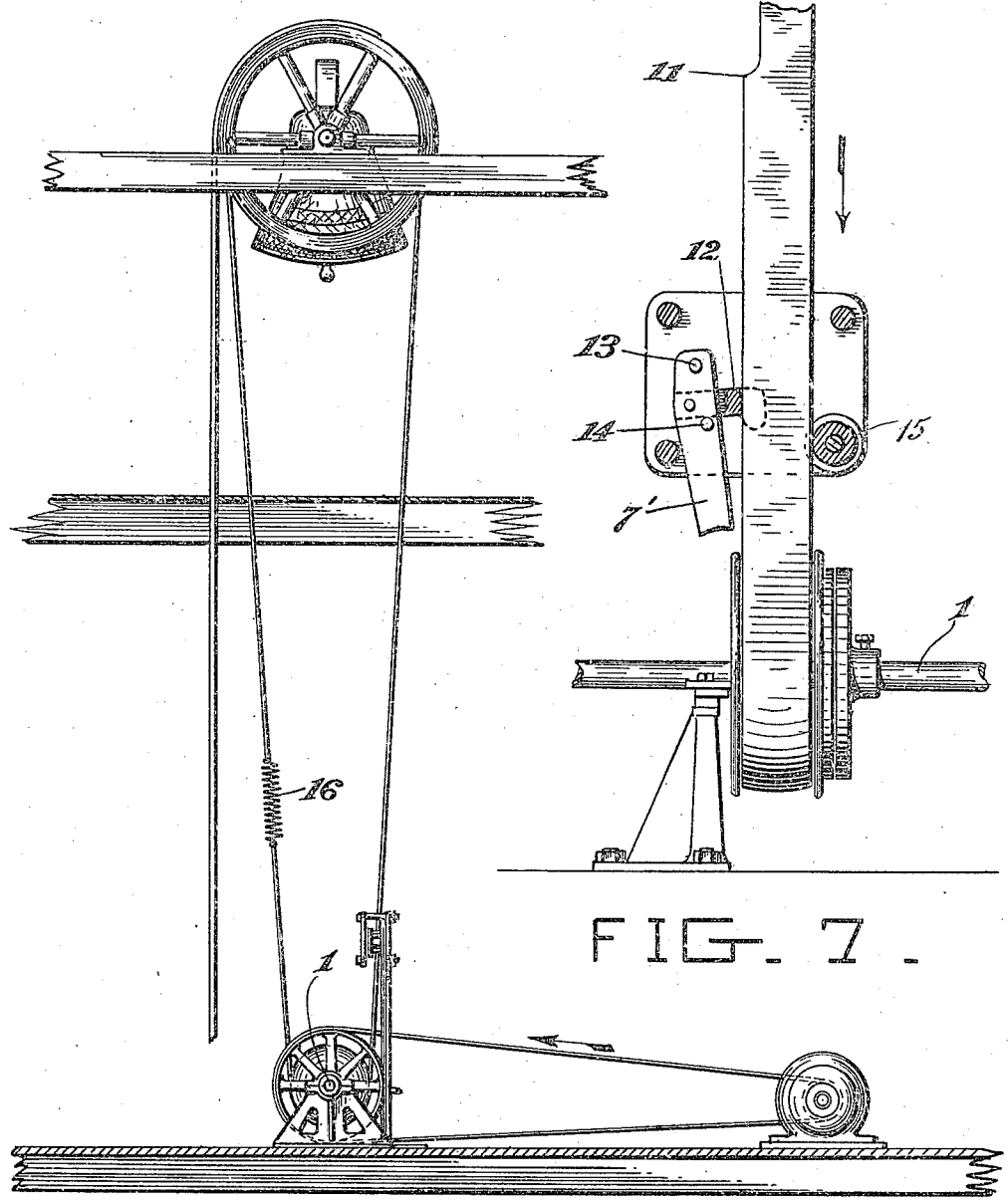

M. JETTÉ, A. BELLEMARE, E. JETTE & J. E. CARIGNAN.
BELL RINGER.
APPLICATION FILED JAN. 25, 1909.

949,077.

Patented Feb. 15, 1910.

2 SHEETS—SHEET 1.

Witnesses:

Alide Bellemare,
Eveline Jetté,
Joseph E. Carignan,
Marcus Jetté
Inventors

By

Attorneys

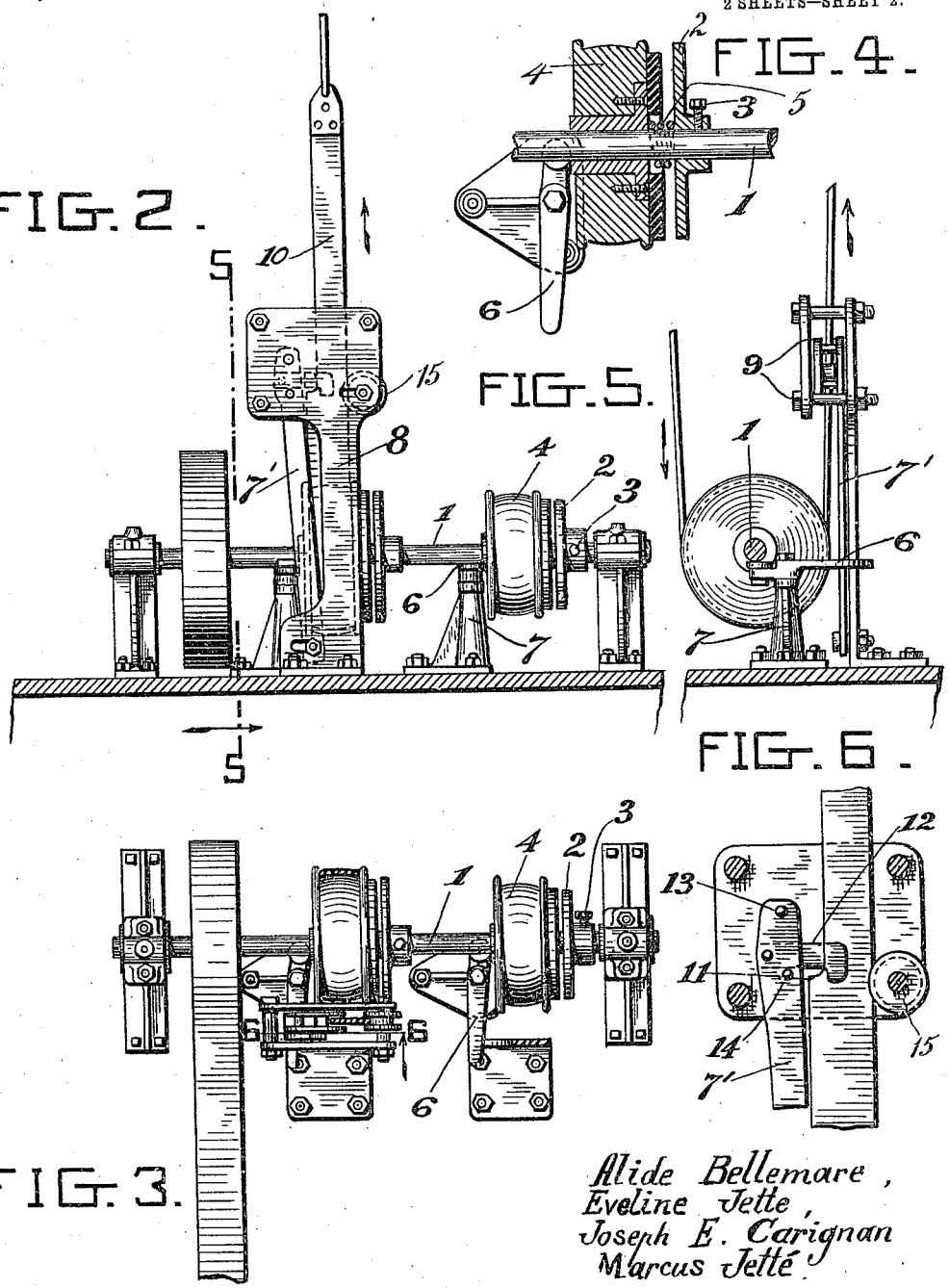

UNITED STATES PATENT OFFICE.

MARCUS JETTÉ, ALIDE BELLEMARE, EVELINE JETTE, AND JOSEPH E. CARIGNAN, OF MONTREAL, QUEBEC, CANADA; SAID BELLEMARE AND SAID CARIGNAN ASSIGNORS TO SAID EVELINE JETTE.

BELL-RINGER.

949,077.      Specification of Letters Patent.      Patented Feb. 15, 1910.

Application filed January 25, 1909. Serial No. 474,098.

*To all whom it may concern:*

Be it known that we, MARCUS JETTÉ, ALIDE BELLEMARE, EVELINE JETTE, and JOSEPH E. CARIGNAN, subjects of the King of Great Britain, residing in the city and district of Montreal, in the Province of Quebec, Canada, have invented certain new and useful Improvements in Bell-Ringers; and we do hereby declare that the following is a full, clear, and exact description of the invention such as will enable others skilled in the art to which it appertains to make and use the same.

The invention to be hereinafter described relates to bell ringing machines, and more particularly to machines adapted to automatically ring one or more bells at a time, as desired.

Broadly speaking, it comprises a continuously driven power shaft, a friction disk or disks fixed to the power shaft to rotate therewith, a pulley or pulleys loosely and slidably mounted on the power shaft, connections between the pulleys and the bell ropes, and means for automatically clutching and unclutching the friction disks and the loose pulleys.

In order to more fully disclose the construction, operation and use of the invention, reference should be had to the accompanying drawings forming part of the present application.

Throughout the several views of the drawings, like reference characters designate the same parts.

In the drawings:—Figure 1 is an end elevation of the invention, showing the application of the same. Fig. 2 is a right hand side elevation of Fig. 1, with the motor omitted. Fig. 3 is a plan view of Fig. 2. Fig. 4 is an enlarged horizontal section through one of the pulleys and its coöperating disk. Fig. 5 is an end view taken on line 5—5 of Fig. 2. Fig. 6 is a vertical section on line 6—6 of Fig. 3 looking in the direction of the arrow; and, Fig. 7 is a view similar to Fig. 6, but showing the clutch actuating lever in operative position.

In the preferred form of the invention, a power shaft 1 is provided which may be of any desired length according to the number of bells to be rung. This shaft is continuously driven in one direction by belt and pulley connections from an electric motor or other source of power.

Driving or friction disks 2 are mounted on the shaft 1 and secured thereto by set screws 3 or the like, to rotate with the shaft. Belt pulleys 4 are slidably and revolubly mounted on the power shaft and are faced with rubber or other friction material adapted to engage the face of the disk 2 to drive the pulley from the disk. A spring 5 is interposed between the pulley 4 and disk 2 to keep them normally separated. In this way the pulley 4 may be driven intermittently from the power shaft, as desired. A lever 6 is pivotally supported on a post 7 adjacent the pulley 4 and adapted to be operated to slide the pulley longitudinally on the power shaft to engage the friction disk.

In order to render the movement of this lever automatic, a special construction has been provided. This construction comprises an upright bar 7' pivotally connected at its lower end to a standard 8 and having its upper end guided between the face of the standard and a plate 9 spaced a slight distance from the standard. This bar has limited swinging movement on its pivot and is so positioned as to engage the outer end of the lever 6 to actuate the same. In order to swing the bar 7' a shifting belt 10 has been devised. This belt is formed with a long centrally disposed section of greater width than the remainder of the belt. This section terminates at its opposite ends in abrupt shoulders 11 adapted to engage a pivotally mounted arm 12 projecting from the bar 7'. The swinging movement of the arm 12 is limited by stops 13 and 14. The stop 13 is placed above the pivot of the arm 12 and in such position as to allow the arm 12 to be swung upward by one of the shoulders 11 without moving the bar 7'. The stop 14, however, is placed in such position as to normally support the arm 12 in a horizontal position. Consequently, as the belt moves in the reverse direction the shoulder at the opposite end of the wide portion of the belt will engage the arm and push it and the bar 7' laterally outward, swinging the bar 7' on its pivot and actuating the clutch lever 6. In order to keep the belt in proper relative position at all times, a grooved guide roller 15 is adjustably mounted on the standard 8 and adapted to receive and guide the straight edge of the belt.

In order to render the operation of the lever 6 certain at all times, the pivot for swinging bar 7' is made adjustable. In this way it may be moved toward or from the lever 6, as desired.

The operation of the invention is as follows: The lever 6 will be swung by hand, or otherwise, to force pulley 4 to frictional engagement by the disk 2. In this way the pulley 4 will be rotated and the belt will be driven in the direction indicated by the arrow in Fig. 7. As soon as the belt starts in this direction its shoulder will engage the outer end of the arm 12 which is resting on stop 14. In the effort to force the arm 12 downward, the bar 7' will be driven laterally outward, thus holding the lever 6 in the position to which it was moved by hand, and so continuing the drive of the belt. The length of the wide part of the belt is such as to insure the drive of the belt one stroke or swing of the bell only. As the bell reaches the end of its swing, the end of the wide part of the belt will pass below the arm 12. In this position the bar 7' is free to move to its initial position. It is returned, at once, by the spring 5, acting through the pulley 4 and lever 6, the spring also acting at the same time to free pulley 4 from disk 2 and allow the pulley to run free on the shaft 1. The weight of the bell on its return stroke will carry the wide part of the belt back to its original position, the arm 12 being swung upward to inoperative position by engagement with a shoulder 11. Of course, as the bell starts its third stroke the original operation will be repeated.

In cases of very heavy bells the great strain on the machinery makes it impossible to start the machine at full speed. Consequently, a lost motion device must be employed. This takes the form of a strong spring 16 connecting the end of the belt and the bell wire. The usual bell rope may very well be left attached to the bell for use in case of breakage or defect in the machinery.

When it is desired to stop the machine it is only necessary to operate the lever 6 to separate the pulley 4 and disk 2.

It is clear that changes may be made in the construction, arrangement and disposition of the several parts of the invention without in any way departing from the field and scope of the same and it is meant to include all such within this application wherein only a preferred form has been disclosed.

Having thus fully described our invention, what we claim as new, and desire to secure by Letters Patent, is:—

1. A bell ringer comprising a power shaft, means for driving said power shaft continuously in one direction, a friction disk secured to said power shaft, a normally stationary drive pulley freely mounted on said power shaft, a lever for intermittently forcing said pulley into engagement with said disk, a swinging arm adapted to actuate said lever, and means for automatically operating said swinging arm.

2. A bell ringer comprising a power shaft, means for driving said power shaft continuously in one direction, a friction disk secured to said power shaft, a pulley loosely mounted on said power shaft and adapted to be forced into frictional engagement with said friction disk, a lever for moving said pulley, a swinging arm adapted to actuate said lever, a belt adapted to operate said swinging arm, and means for guiding said belt.

3. A bell ringer of the character described, comprising a power shaft, means for driving said power shaft continuously in one direction, a friction disk secured to said power shaft, a normally stationary drive pulley freely mounted on said power shaft, a lever for intermittently forcing said pulley into engagement with said disk, a pivotally mounted bar adapted to actuate said lever, means for adjusting said bar, and means for operating said bar.

4. A bell ringer of the character described, comprising a power shaft, means for driving said power shaft continuously in one direction, a friction disk secured to said power shaft, a normally stationary drive pulley freely mounted on said power shaft, a lever for intermittently forcing said pulley into engagement with said disk, a pivotally mounted bar adapted to actuate said lever, and a swinging arm connected to said bar and adapted to actuate the same, and means adapted to engage and operate said arm.

5. A bell ringer of the character described, comprising a power shaft, means for driving said power shaft continuously in one direction, a friction disk secured to said power shaft, a drive pulley loosely mounted on said power shaft and adapted to be forced into engagement with said disk, a lever for forcing said pulley into engagement with said disk, a pivotally mounted bar adapted to actuate said lever, a swinging arm adapted to actuate said bar, a belt provided with shoulders adapted to engage and operate said swinging arm, a bell, and connections between said belt and said bell.

6. A bell ringer of the character described, comprising a power shaft, means for driving said power shaft continuously in one direction, a friction disk secured to said power shaft, a drive pulley loosely mounted on said power shaft and adapted to be forced into engagement with said friction disk, a lever for forcing said pulley into engagement with said disk, a pivotally mounted bar adapted to actuate said lever, a swinging arm adapted to actuate said bar, a belt provided with shoulders adapted to engage and operate said swinging arm, means for maintaining engagement of said arm by said belt, a bell, and connections between said belt and said bell.

7. A bell ringer of the character described, comprising a power shaft, means for driving said power shaft continuously in one direction, a friction disk secured to said power shaft, a drive pulley loosely mounted on said power shaft and adapted to be forced into engagement with said friction disk, a lever for forcing said pulley into engagement with said disk, a pivotally mounted bar adapted to actuate said lever, a swinging arm adapted to actuate said bar, a belt provided with shoulders adapted to engage and operate said swinging arm, means for limiting the swinging movement of said arm, a bell, and connections between said belt and said bell.

8. A bell ringer of the character described, comprising a power shaft, means for driving said power shaft continuously in one direction, a friction disk secured to said power shaft, a drive pulley loosely mounted on said power shaft and adapted to be forced into engagement with said friction disk, a lever for forcing said pulley into engagement with said disk, a pivotally mounted bar adapted to actuate said lever, a swinging arm adapted to actuate said bar, a belt provided with shoulders adapted to engage and operate said swinging arm, adjustable means for maintaining engagement of said arm by said belt, a bell, and connections between said belt and said bell.

In witness whereof we have hereunto set our hands in the presence of two witnesses.

MARCUS JETTÉ.
ALIDE BELLEMARE.
EVELINE JETTE.
JOSEPH E. CARIGNAN.

Witnesses:
W. S. BABCOCK,
T. MYNARD.